June 5, 1951　　　　H. V. HAGELY　　　　2,555,336
TRAILER SUPPORT
Filed Nov. 21, 1949　　　　　　　　　　3 Sheets-Sheet 1
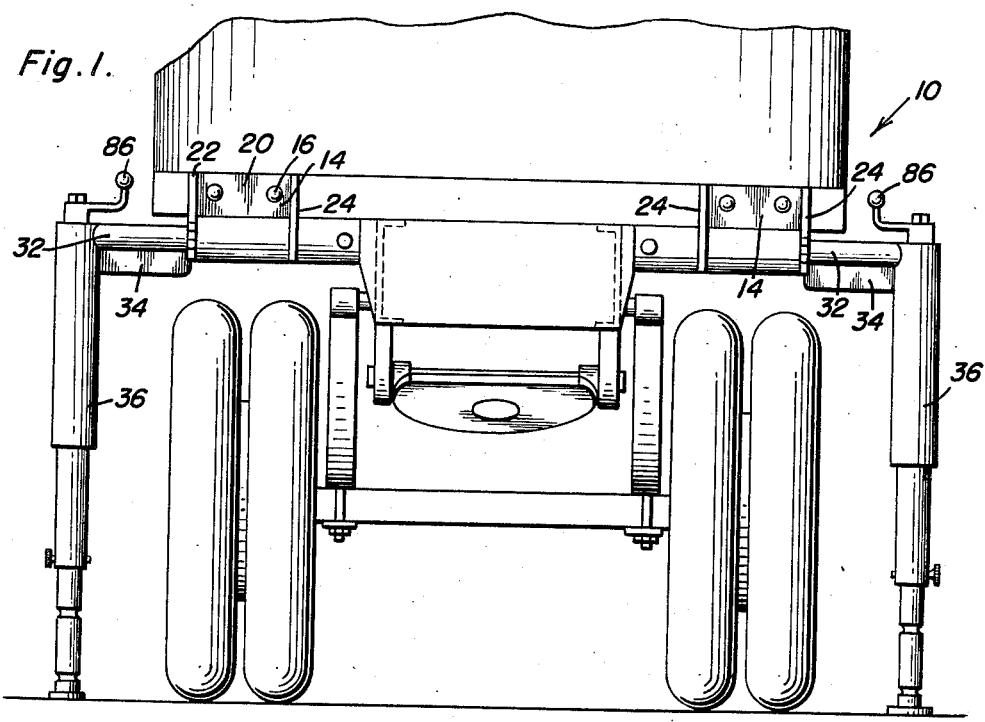
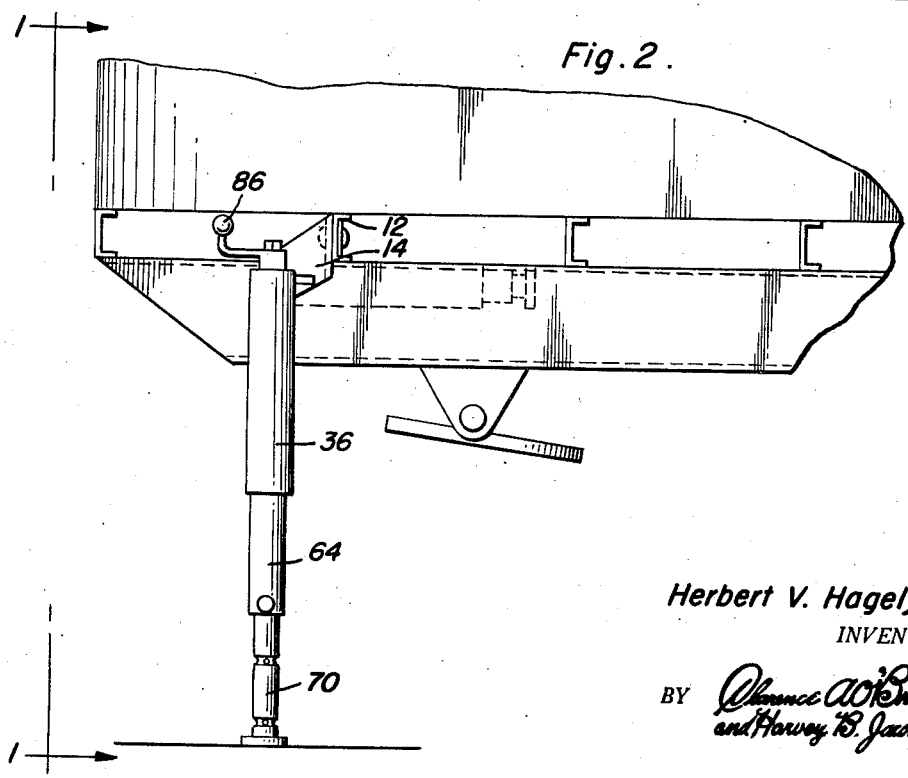
Herbert V. Hagely
INVENTOR.

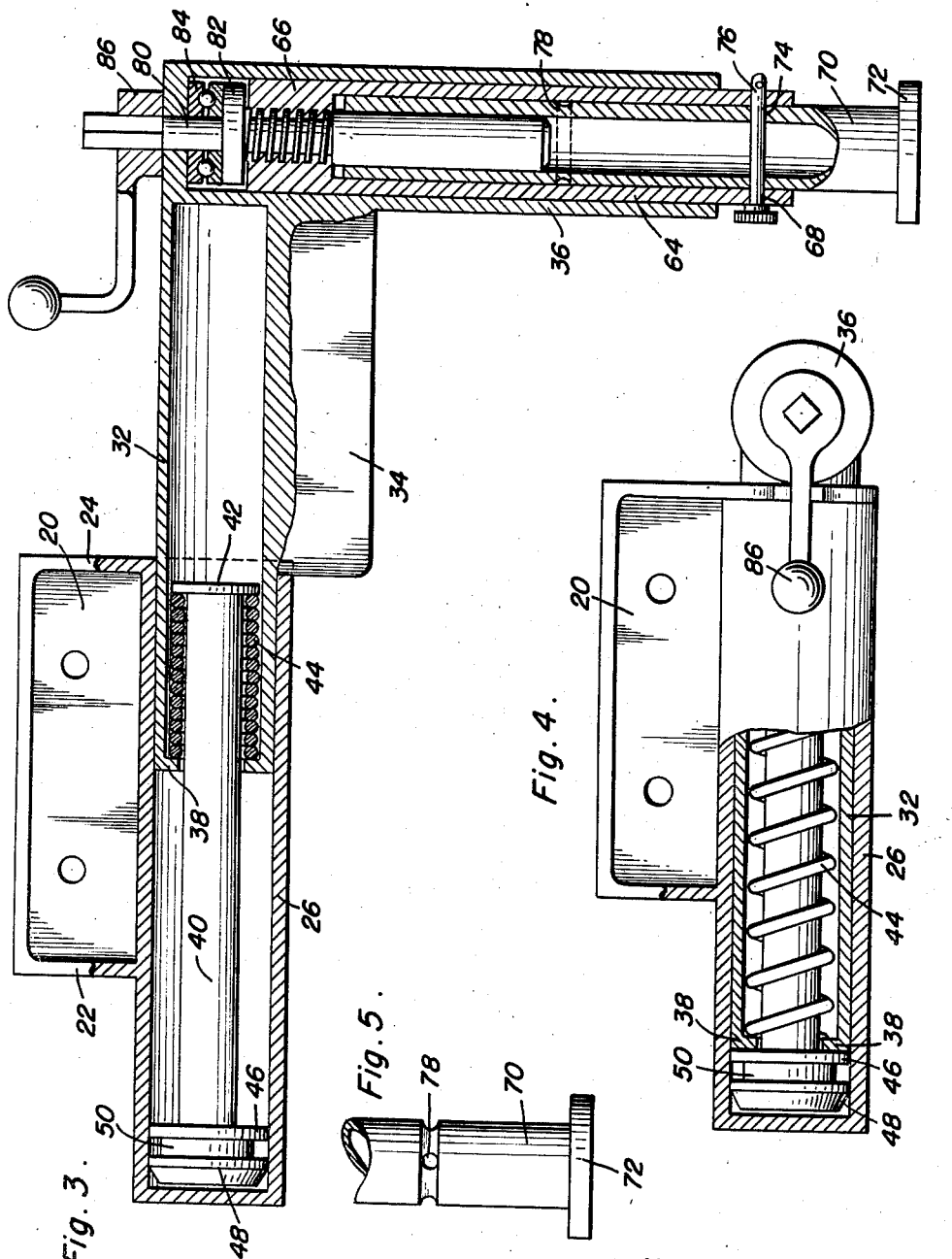

June 5, 1951 H. V. HAGELY 2,555,336
TRAILER SUPPORT
Filed Nov. 21, 1949 3 Sheets-Sheet 3

Herbert V. Hagely
INVENTOR.

Patented June 5, 1951

2,555,336

UNITED STATES PATENT OFFICE 2,555,336

TRAILER SUPPORT

Herbert V. Hagely, East St. Louis, Ill.

Application November 21, 1949, Serial No. 128,529

3 Claims. (Cl. 254—86)

This invention relates to a vehicle support, and more particularly to an assembly for supporting the front end of a trailer when the trailer has been detached from the tractor vehicle.

An object of this invention is to provide means for supporting a trailer which is rotatable to an inoperative out-of-the-way position when the trailer is being towed behind a tractor vehicle and which may be readily moved to and held in an operative position when it is desired to withdraw the tractor vehicle from the trailer.

A further object of this invention is to provide a trailer support having jack means incorporated therein for aiding in the releasing of the tractor vehicle from the trailer.

Still further objects of the invention reside in the provision of a trailer support that is strong, durable, highly efficient in operation, simple in construction and manufacture, easy to operate, capable of being positioned when in an inoperative position in an unobtrusive place, and including means for easy installation on a trailer vehicle.

These, together with the various ancillary objects of the invention which will become apparent as the following description proceeds, are attained by this trailer support, a preferred embodiment of which has been illustrated in the accompanying drawings, by way of example only, wherein:

Figure 1 is a front elevational view of the trailer showing the trailer supports in an operative position, the direction of the view being as taken along line 1—1 in Figure 2;

Figure 2 is a side elevational view showing the invention in an operative position;

Figure 3 is a vertical sectional view of the invention showing the elements thereof in great detail;

Figure 4 is a top plan view of the invention shown in its inoperative position with parts thereof being broken away to show other parts in greater detail;

Figure 5 is an elevational detail of one element of the invention;

Figure 6:
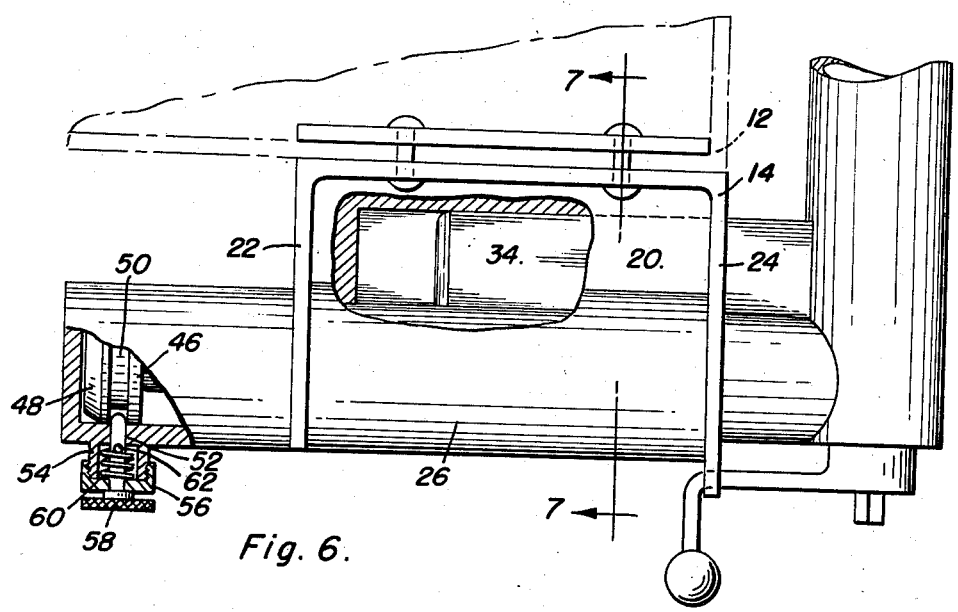
Figure 6 is a further elevational view of the invention, parts thereof being broken away to show other parts in section.

With continuing reference to the accompanying drawings wherein like reference numerals designate similar parts throughout the various views, reference numeral 10 generally designates a trailer or like vehicle having a frame on which the trailer supports are adapted to be secured. To this frame 12 which is usually formed from channel members, the housing 14 is secured by means of rivets 16 and clamp plate 18. However, it is within the contemplation of this invention to use any suitable means for securing the housing to the frame such as welding or the like.

The housing 14 consists of an attaching plate 20, web supporting plates 22 and 24 and a casing 26 which is formed with a substantially cylindrical hollow portion 28 having a keyway 30 in communication therewith. The housing 14 is preferably molded or cast in a single integral section.

Figure 7:
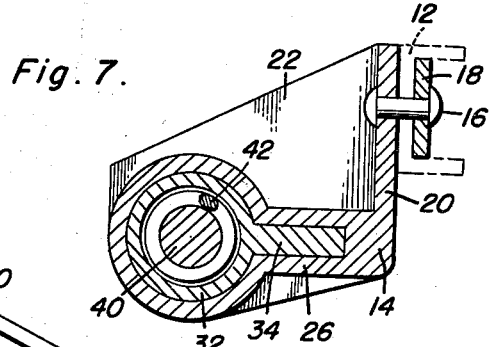
Figure 7 is a sectional view as taken along line 7—7 in Figure 6.
Figure 8:
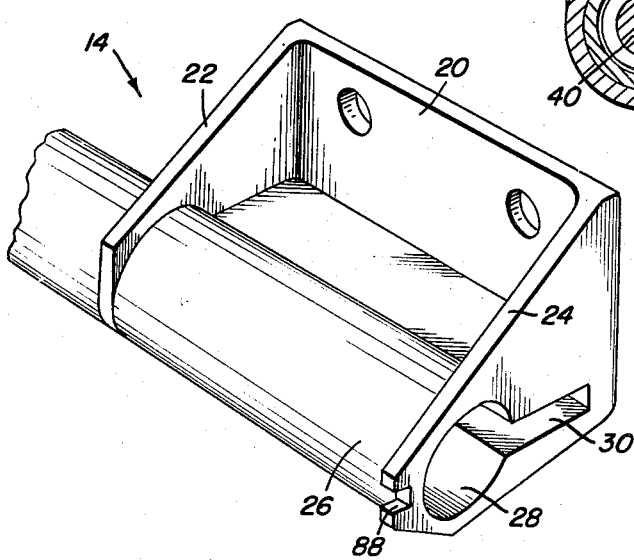
Figure 8 is a perspective view of the housing comprising an important element of the invention.

Referring now more particularly to Figures 3 and 7, it will be seen that a shaft 32 having a key 34 integral therewith and a tubular member 36 secured thereto is positioned within the opening 28 with the key 34 selectively engaged within the keyway 30. The inner end of the shaft 32 is formed with an annular shoulder 38. A piston 40 having an annular collar 42 at its outer end which may be formed integrally with the piston 40 or secured thereto at any subsequent time is emplaced in the casing 26 with the portion of the piston including the collar 42 extending into the hollow shaft 32. A spring 44 is so positioned as to continuously bias the shoulder 38 and the collar 42. At the other end of the shaft 40 is a collar 46 and a conical shaped retaining plate 48. Between the plate 46 and the plate 48 is a portion 50 of larger diameter than the shaft 40. An aperture 52 is formed in the casing 26 and a neck portion 54 which is externally threaded and has an internal recess in communication with the aperture 52 is formed integral with the casing 26. A capping member 56 is threaded on the neck portion 54 and a headed pin element 58 is positioned through the capping member 56 the neck 54 and the aperture 52. A spring 60 biases a pin 62 set in the headed pin 58 and the capping member 56 thus continuously urging the headed pin 58 inwardly of the casing 26.

Referring to Figures 1 through 3 it will be seen that the tubular member 36 houses a first telescoping element 64 which is formed with an internally threaded portion 66, and which also has an aperture 68 in its lower portions. The second telescoping element 70 having a ground engaging base plate 72 at its bottom end is housed within the first telescoping element 64 and has an aperture 74 therethrough adapted to be positioned in alignment with the aperture 68 so that a headed pin 76 can be secured within the apertures 68 and 74. Furthermore, the second or inner telescoping element 70 is provided with an additional aperture 78 therethrough which may be selectively used instead of aperture 74 to pin the first and second telescoping elements together.

A shaft 80 externally threaded is secured in threaded engagement with the portion 66 of the element 64. A collar 82 is formed on the shaft 80 and a bearing element, preferably a ball bearing 84 is positioned between the collar 82 and the member 36. A handle 86 is rigidly secured to the upper portion of the shaft 80 so that the shaft may be readily rotated as desired. The housing 14 is provided with a slot 88 therein for selective reception of the handle 86.

To affix the trailer support within the housing 14 which is permanently attached to the trailer, it is necessary to position the shaft 32 together with the piston 40 within the opening 28. The key 34 will enter the keyway 30 and then the entire assembly may be pushed inward until the the conical portion 48 rides over the pin 58 which then engages between the two plates 48 and 46 to hold the piston 40 rigidly in place. To place the jack in an operating or vertical position the support is moved outwardly against the spring 44 until the key or gusset plate 34 is outside of the slot or keyway 30. Then the member 36 is rotated to a vertical position and the key 34 will engage the supporting plate 24. Then the pin 68 may be withdrawn and the telescoping member 70 may be slide down until the aperture 78 is in alignment with the aperture 68. Then the pin may be replaced. Actually there may be a number of apertures 78 in spaced position through the member 70 so that the member 70 may be lowered a desired distance. The final adjustment of the support is accomplished with the rotation of the handle 86 to raise or lower the telescoping members as desired.

Since from the foregoing, the construction and advantages of this trailer support are readily apparent, a further description is believed to be unnecessary.

However, since numerous modifications will readily occur to those skilled in the art after a consideration of the foregoing specification and accompanying drawing, it is not intended to limit the invention to the precise embodiment of trailer supports shown and described, but all suitable modifications and equivalents may be resorted to which fall within the scope of the appended claims.

Having described the invention, what is claimed as new is:

1. An adjustable support for a trailer comprising a housing adapted to be secured to a trailer frame, said housing having an axial passageway therein including a keyway selectively receiving a hollow shaft having a key secured thereto, said shaft being formed with an annular shoulder at one end thereof, a piston in said housing extending into said shaft, a collar secured to said portion of said piston in said shaft, spring means biasing said collar and said shoulder, and a ground engaging member secured to said shaft at substantially right angles thereto.

2. An adjustable support for a trailer comprising a housing adapted to be secured to a trailer frame, said housing having an axial passageway therein including a keyway selectively receiving a hollow shaft having a key secured thereto, said shaft being formed with an annular shoulder at one end thereof, a piston in said housing extending into said shaft, a collar secured to said portion of said piston in said shaft, spring means biasing said collar and said shoulder, and a ground engaging member comprising a plurality of sections telescopically secured together secured to said shaft at substantially right angles thereto.

3. An adjustable support for a trailer comprising a housing adapted to be secured to a trailer frame, said housing having an axial passageway therein including a keyway selectively receiving a hollow shaft having a key secured thereto, said shaft being formed with an annular shoulder at one end thereof, a piston in said housing extending into said shaft, a collar secured to said portion of said piston in said shaft, spring means biasing said collar and said shoulder, a ground engaging member comprising a casing and a telescoping member secured to said shaft at substantially right angles thereto, and crank means secured in said casing selectively raising and lowering said telescoping member relative to said casing.

HERBERT V. HAGELY.

REFERENCES CITED

The following references are of record in the file of this patent:

UNITED STATES PATENTS

| Number | Name | Date |
|---|---|---|
| 136,959 | Bennor | Mar. 18, 1873 |
| 708,045 | Houdyshell | Sept. 2, 1902 |
| 2,458,312 | Stephen | Jan. 4, 1949 |

FOREIGN PATENTS

| Number | Country | Date |
|---|---|---|
| 393,741 | France | Nov. 5, 1908 |